United States Patent [19]

McInroy et al.

[11] 4,454,576
[45] Jun. 12, 1984

[54] REPORT PREPARATION

[75] Inventors: John W. McInroy; Paul D. Waldo; Jo A. Elliott; Thomas L. Adam, all of Austin; Freddie R. White, Georgetown, all of Tex.

[73] Assignee: International Business Machines Corporation, Armonk, N.Y.

[21] Appl. No.: 264,624

[22] Filed: May 18, 1981

[51] Int. Cl.³ .......................... G06F 3/02; G06F 3/14
[52] U.S. Cl. .................................................. 364/200
[58] Field of Search ... 364/900 MS File, 200 MS File; 400/63

[56] References Cited

U.S. PATENT DOCUMENTS

| | | | |
|---|---|---|---|
| 3,980,994 | 9/1976 | Ying et al. | 364/200 |
| 4,064,557 | 12/1977 | Bluethman et al. | 364/900 |
| 4,078,249 | 3/1978 | Lelke et al. | 364/200 |
| 4,085,445 | 4/1978 | Blevins et al. | 364/900 |
| 4,198,685 | 4/1980 | Corwin et al. | 364/900 |
| 4,209,845 | 6/1980 | Berger et al. | 364/900 |
| 4,315,309 | 2/1982 | Coli | 364/200 |

Primary Examiner—Mark E. Nusbaum
Assistant Examiner—Mark P. Watson
Attorney, Agent, or Firm—Harold E. Meier

[57] ABSTRACT

A system for use in an electronic digital signal processor for assembling multiple report definition instructions to create a shell document to generate a file report. The system enables an operator to depress an instruction key to call up an instruction menu and select for display the report definition instruction menu. The operator chooses report instructions desired in any order, and the system inserts chosen instructions in proper order to build the shell document. The operator keys report information in between the instructions. The shell document is stored in machine-dependent language to enable the document to be redisplayed in operator-dependent language as determined by the current program loaded in the processor.

11 Claims, 13 Drawing Figures

MESSAGE INDEX TABLE MIT

| | |
|---|---|
| CONTROL TYPE (x'60') REPORT DEFINITION | |
| ENTRY LENGTH (x'0A') | |
| CONT. PREFIX MFI# | f |
| CONT. SUFFIX MFI# | f |
| PARM TYPE 2 MFI# | REPORT PREFACE |
| PARM TYPE 3 MFI# | PAGE HEADING |
| PARM TYPE 4 MFI# | GROUP HEADING |
| PARM TYPE 5 MFI# | DETAIL |
| PARM TYPE 6 MFI# | GROUP SUMMARY |
| PARM TYPE 7 MFI# | REPORT SUMMARY |
| CONTROL TYPE (62): ARITMETIC | |
| ENTRY LENGTH | |

FIRST MIT ENTRY (rows 1–10)
SECOND MIT ENTRY
NTH MIT ENTRY

```
| CREATE  DOCUMENT      | REPORT |         |       |       |          |
| DISK 01 |              |        | PG. 1   | L.N. 7| KYB 1 | PITCH 12 |
```

FILE REPORT

| ID | ITEM | YOUR CHOICE | POSSIBLE CHOICES | |
|----|------|-------------|------------------|---|
| a | REPORT PREFACE | 1 | 1 = YES | 2 = NO |
| b | PAGE HEADING | 1 | 1 = YES | 2 = NO |
| c | GROUP HEADING | DEGREE | NAME OF ANY FIELD IN FILE | |
| d | GROUP HEADING | SCHOOL | NAME OF ANY FIELD IN FILE | |
| e | GROUP HEADING | | NAME OF ANY FIELD IN FILE | |
| f | DETAIL | 1 | 1 = YES | 2 = NO |
| g | GROUP SUMMARY | | NAME OF ANY FIELD IN FILE | |
| h | GROUP SUMMARY | SCHOOL | NAME OF ANY FIELD IN FILE | |
| i | GROUP SUMMARY | DEGREE | NAME OF ANY FIELD IN FILE | |
| j | REPORT SUMMARY | 1 | 1 = YES | 2 = NO |

WHEN FINISHED, PRESS ENTER

REPORT INSTRUCTIONS MUST APPEAR IN DOCUMENT IN ORDER INDICATED ABOVE. ANY FILE REPORT MUST BEGIN WITH ONE OF THESE INSTRUCTIONS.

TYPE ID LETTER TO CHOOSE ITEM, PRESS ENTER: ⊬

FIG. 12

```
+REPORT PREFACE+           REVENUE ANALYSIS
                             YEAR TO DATE
+PAGE HEADING+
REPRESENTATIVE     DATE      CUSTOMER          AMOUNT

+GROUP HEADING, REP+
+REPORT DETAIL+
              ⊬MM⊬/⊬DD⊬/⊬YY⊬/⊬CUST_NAME⊬, 1⊬
+GROUP SUMMARY, REP+
+LET, GRP T = SUM. AMT+
+LET, GRP A = AVG. AMT+
                           TOTAL              ⊬GRP T, 2⊬
                           AVERAGE AMOUNT          ⊬GRP A, 2⊬

+REPORT SUMMARY+
+LET, RT = SUM. AMT.+
+LET, RMAX = MAX. AMT+
+LET, RMIN = MIN. AMT.+
+LET, RAVG = AVG. AMT.+
```

|  | REPORT SUMMARY | |
|---|---|---|
| | TOTAL | ⊬RT, 2⊬ |
| | LARGEST | ⊬RMAX, 2⊬ |
| | SMALLEST | ⊬RMIN, 2⊬ |
| | AVERAGE | ⊬RAVG, 2⊬ |

FIG. 13

REPORT PREPARATION

DESCRIPTION

BACKGROUND OF THE INVENTION

1. Field of the Invention

This invention relates to a system for preparing a file report for an electronic digital signal processor. In particular, it pertains to a system using machine independent user language in the display of a menu of report definition instructions to enable an operator to select multiple report definition instructions to generate a shell document to be stored for use in the electronic digital signal processor to control logical separation of the file report on output.

2. Description of Prior Art

Electronic digital signal processing systems have been previously developed as operator-controlled word and data processing machines. Word/data processing machines have also been developed to perform text processing functions, such as the generation of several types of merged output, e.g., repetitive letters and file reports. The definition of such file reports is created by the operator's generation of a shell document, which is a program to provide instructions for the electronic digital signal processor in performing the task of preparing a report from a file of records.

Report preparation has previously involved the generation of a shell document based upon keying to a menu of report instructions. Keying to a menu has been accomplished with a symbol shell, which allows the shell to be utilized by operators who speak and read different languages. As an example of a prior art report preparation resulting in a symbol shell, an operator selecting Report Preface, Group Heading, and Detail from a menu might have displayed the symbol "&," ";," and ":" representing these three instructions. Such a report preparation system requires an operator to remember and correlate menu symbols, which creates operator confusion and increasing difficulty in the preparation of a report as the number of shell items and symbols increases. The operator's creation of a shell document, which is essentially a computer program, is a rather complex, error-prone task. A need has thus arisen for a system for report preparation to display a variety of instructions in a meaningful way for operators that speak and read different languages, to properly enter and intersperse report instructions and reports texts, and to minimize operator errors in a complex report preparation.

SUMMARY OF THE INVENTION

The report preparation system of the present invention provides additional text processing function and means for word/data processing operators who speak and read different languages to interface with the word data processing machines. Keying errors are minimized by presenting the operator with a menu of report instructions in the user's language from which the operator can select the desired instructions. The report preparation system automatically inserts the instructions in the order in which they are displayed, top to bottom, in the menu, regardless of the order in which the operator selects the instructions. The report definition instruction menu of the report preparation system is laid out in a display unit to visually reinforce the concept of a nested hierarchy of groups of records.

The report preparation system also includes an automatic carrier return after each report definition instruction to facilitate the entry of report text.

The operator creates a file report shell document which will normally contain several different types of report definition instructions. Since the instruction symbol used in a Hidden-Codes Mode of display is not always sufficient to show the operator the different report sections, a Display-Codes Mode of display is provided to display each instruction in the operator's language. The words visually displayed to the operator, e.g., "Report Preface," in English, are in the language of the current program loaded in the word processor, regardless of the language loaded when the shell document was created, e.g., French.

The report preparation system of the present invention is easier for an operator to learn, because the system presents the instruction type in words in the language of the operator. For the same reason, it is more error resistant than prior art report preparation systems utilizing only shell symbols.

As noted above, the lines of report definition instructions comprising the report definition instruction menu are indented to reinforce the hierarchical function of the instructions. The layout of the report definition menu indicates that multiple Page Headings and Group Headings/Summaries occur for a single Report Preface and Report Summary. The menu also indicates that Group Headings/Summaries can be nested up to three levels, and a Record Detail, by definition, occurs within the innermost Group Heading/Summary. An explanatory instruction to the operator appears with the report definition instruction menu to reinforce the concept of the hierarchial functioning of the report instructions. The system provides a visual feedback for the concept of nested groups, a common report function with the systems having multilevel sorting capacity.

The report preparation system display of report controls using language-dependent words includes multibyte merge and file report controls to provide a means of identifying a control embedded within a data stream via language-dependent words. The system's controls format is also economical to implement in RAM and permits information to be stored densely on a diskette.

The operator may interface with the systems controls by the Hidden-Codes Mode Display or the Display-Codes Mode. The Hidden-Codes Mode displays the control by a single display character. In the Display-Codes Mode, the display of the control is represented by an operator dependent language which may consist of graphics and/or words.

BRIEF DESCRIPTION OF THE DRAWINGS

For a more complete understanding of the present invention and further objects and advantages thereof, reference is now made to the following Detailed description taken in conjunction with the accompanying drawings, in which.

DETAILED DESCRIPTION

Figure 1:
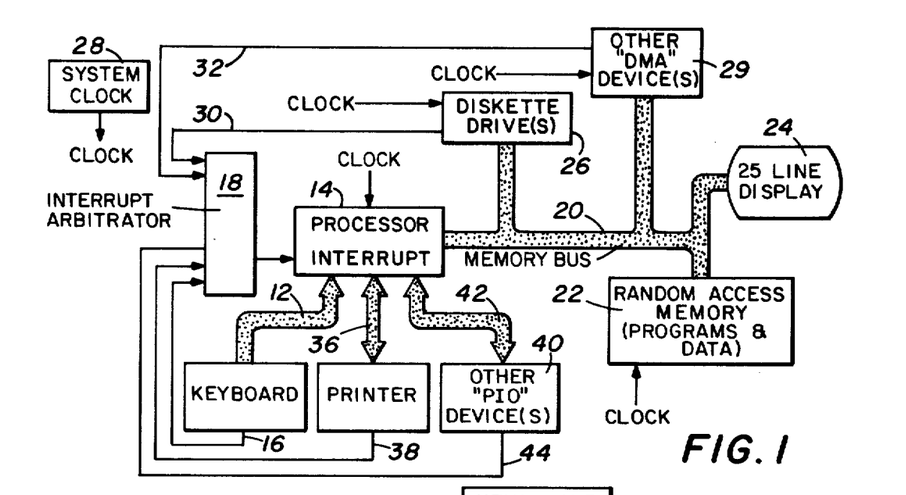
FIG. 1 is a block diagram of a word/data processing system utilizing the present invention.

Referring to FIG. 1, a block diagram of a word/data processing system implementing the present invention is illustrated. A keyboard 10 is provided for inputting graphic characters, data and instructions to the word-/data processing system. The graphic characters, data and instructions on the keyboard 10 are applied through a data bus 12 to an electronic digital signal processor 14 of the system. The processor 14 may be implemented by a commercially available microprocessor, such as the Intel Corporation's 8086 processor. The Intel 8086 processor executes on one level with one set of registers.

The keyboard 10 also applies a hardware interrupt signal via interrupt line 16 to an interrupt arbitrator 18. The 8259-A Interrupt Controller was selected to implement the interrupt arbitrator 18 to resolve interrupt requests from the incoming interrupt lines. The 8259-A Interrupt Controller may resolve interrupt requests from up to eight interrupt lines into eight priority levels for the 8086 processor 14.

The processor 14 performs the various control functions necessary for the word/data processing system to process, edit and display data. Processor 14 is connected by a memory bus 20 to a random access memory 22 for storing system data and programs. A visual display 24 is also connected by the memory bus 20 to the processor 14 for displaying data and information for enabling communication between the system and an operator of the system. A diskette drive 26 driven by the system clock 28 is also connected through the memory bus 20 to the processor 14. The diskette drive 26 comprises means for accessing the system programs loaded from a program library onto diskettes. Modules in the program library may be loaded or deleted from the diskettes. The word/data processing system may include other direct memory access "DMA" devices 29 connected by the memory bus 20 to the processor 14. The diskette drives and other "DMA" devices 29 provide hardware interrupt signals on interrupt lines 30 and 32, respectively, to the input arbitrator 18.

A printer 34 communicates via an output data bus 36 with the processor 14 for providing a printed record of keyboard entered data or instructions from the system. The printer 34 provides another hardware interrupt signal via interrupt signal line 38 to the input arbitrator 18. Other processor input/output devices 40 may also be provided as part of the system. The processor input-/output devices 40 may communicate via an output data bus 42 to the processor 14 and provide a hardware interrupt signal by interrupt signal line 44 to the interrupt arbitrator 18.

Figure 2:
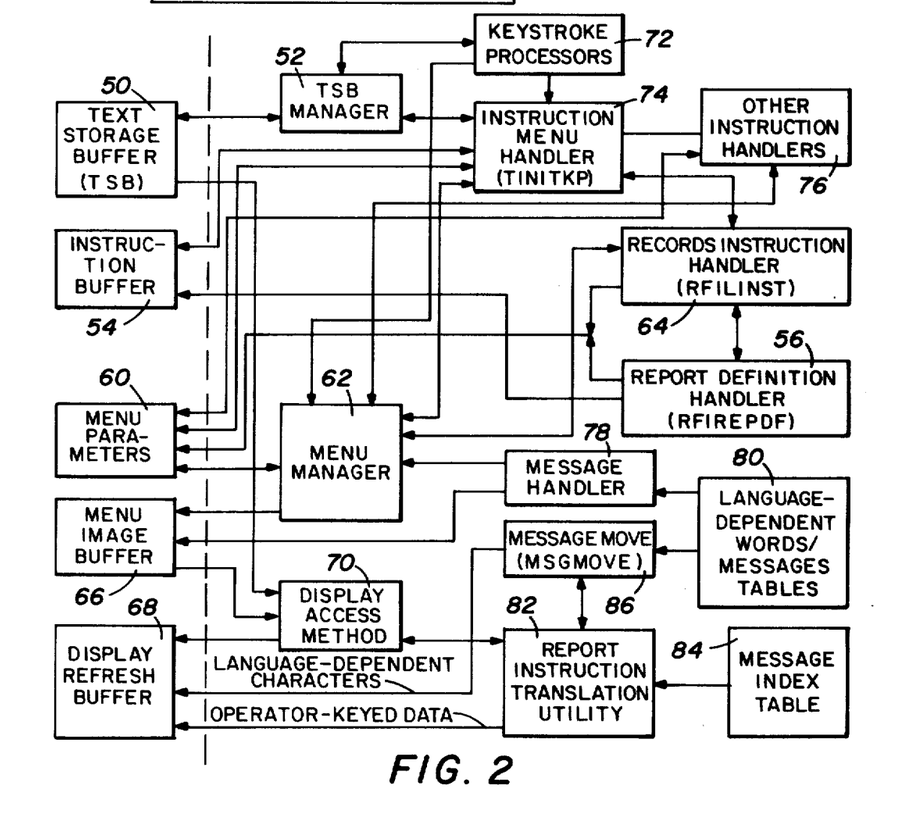
FIG. 2 is a block diagram illustrating the data and programs in the random access memory in the word/data processing system illustrated in FIG. 1.

FIG. 2 is an overview of the random access memory 22 (programs and data) of FIG. 1. FIG. 2 has been organized to illustrate the data area on the left side and the programs and fixed tables on the right side.

A text storage buffer (TSB) 50 contains the text characters and controls during editing operations. For existing pages of text, the data in the TSB 50 is supplied from diskette drive unit 26 under the direction of the TSB manager program 52. The TSB 50 may also write to the disk via the TSB manager 52.

An instruction buffer 54 is provided to temporarily store instructions constructed by the report definition handler (RFIREPDF) 56 as a result of menu interaction by the operator.

A menu parameters 60 stores static and dynamic data to be used by the menu manager 62 in interacting with the system's operator. The menu parameters 60 are set up by the user before calling the menu manager 62. As a result of the operator menu entries, the menu manager 62 may change some or all of the dynamic data in the menu parameters 60. The calling program uses the resultant dynamic data to decide the number of instructions to put into the instruction buffer 54. As an example, after a menu manager 62 call, the records instruction handler (RFILINST) 64 uses the dynamic data to decide the number of instructions, their order and type to put into the instruction buffer 54.

A menu image buffer 66 stores the formatted menu-image data using text characters and controls constructed by the menu manager 62 from tables and data in the menu parameters 60 area.

A display refresh buffer 68 stores the actual codes that are used by the display hardware to output an image on the display 24. The codes are constructed by the Display access method 70 from either the menu image buffer 66 (when a menu is displayed) or the text storage buffer 50 (when text is displayed).

During normal keying operations, keystroke processors 72 are invoked to interact with the TSB manager 52 to add text, revise text and delete text in the text storage buffer 50. As text is added or edited the display access method 70 formats it into the display refresh buffer 68 for display to the operator.

One of the keys the operator can depress is the Instruction key. The Instruction Keystroke Processor of keystroke processors 72 invokes the instruction menu handler routine 74 (TINITKP). The instruction menu handler routine 74 establishes the menu parameters 60 for the instruction menu and calls the menu manager 62. The menu manager 62 interacts with the operator via the keystroke processors 72 to determine which of the various instructions has been selected. The appropriate instruction handler (other instruction handlers 76) is invoked by the TINITKP routine 74. The instruction handler invoked uses the menu manager 62 and related data areas as necessary to select and construct a single instruction in the instruction buffer 54. The TINITKP routine 74 then inserts the constructed instruction into the text storage buffer via the TSB manager 52.

While any menu is displayed, the menu manager 62 constructs the static menu information in the menu image buffer 66 by calling the message handler 78. The message handler 78 builds the static data into the menu image buffer 66 by referencing language-dependent words/message tables 80. At any given time, one language is supported, i.e., its tables are loaded into RAM 22, and all data fetched from these tables for display on the menu are in that language. Dynamic data may be changed by the operator and is fetched from the menu manager 62 from the menu parameters 60 area for display. Resultant changes are stored back in the menu parameters area 60.

When an operator selects the report definition handler 56 option in the instruction menu, the TINITKP routine 74 invokes the record instruction handler (RFILINST) routine 64, which in turn invokes the report definition handler (RFIREPDF) routine 56 to set up the menu parameters area 60. The RFILINST routine 64 then calls the menu manager to display the report definition menu. (See FIG. 12) Unlike other instruction handlers, the operator can select multiple instructions. After the operator has completed interaction with the system, the menu manager 62 returns to RFILINST routine 64. The RFILINST routine 64 invokes RFIREPDF routine 56, which reads the dynamic data in the menu parameters area 60 to determine which instructions have been selected. Regardless of the sequence in which the operator selected the instructions, RFIREPDF routine 56 constructs the list of selected instructions into the instruction buffer 54 in the order in which they were displayed top-to-bottom in the report definition menu. Two carrier returns are inserted between each two instructions. The RFIRPDF routine 56 returns to the RFILINST routine 64 which returns to the TINITKP routine 74. The TINITKP routine takes the multiple instructions in the instruction buffer 54 and stores them in the text storage buffer 50 via calls to the text storage buffer manager 52.

After the instructions and carrier returns have been inserted into the TSB 50, the operator is back in the normal keying mode. The other controls and text needed to complete a shell document can be keyed between the report definition controls.

The display access method 70 still translates TSB 50 data into the display refresh buffer 68. However, when an instruction (report or otherwise) is encountered, a special report instruction translation utility (RITU) routine 82 is invoked. The RITU routine 82 examines the instruction and uses a message index table 84 to build a display image for the instruction. This display image usually contains some language-dependent words. These are referenced indirectly in the message index table 84. The RITU routine 82 passes the reference to the message move (MSGMOVE) routine 86, which uses an algorithm similar to the message handler 78 to transfer the words from the language-dependent words/messages tables 80 into the display refresh buffer 68. The language used will be the language currently loaded in the words/messages table language, regardless of which language was active in the system when the instruction was created from a report definition menu.

Figure 3:
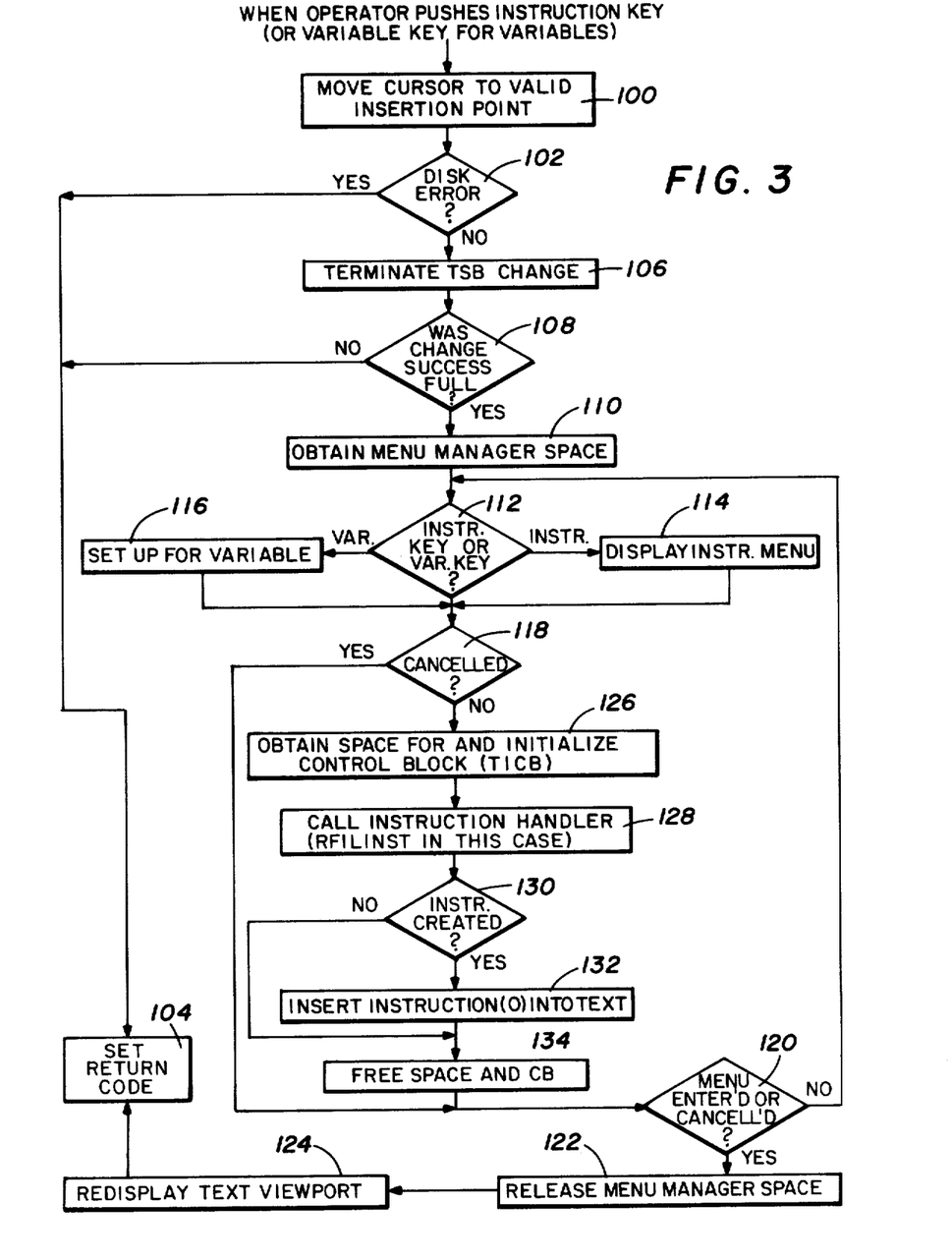
FIG. 3 is a flow chart diagram of the TINITKP program routine.

Referring to FIG. 3, the TINITKP program routine 74 is set forth in a flow chart arrangement. The TINITKP routine 74 may be invoked when the operator pushes the Instruction (INSTR) key or the variable (VAR) key for variables. The depression of a key initiates an instruction 100 to move the cursor to a valid insertion point to make a disk error inquiry 102. If there is a disk error, the routine branches to the set return code 104 and returns control to the operator. If there is no disk error, the routine executes the terminate TSB change instruction 106 and advances to the inquiry 108 to determine if the change was successful. If the change was not successful, the routine branches to the set return code 104 to return control to the operator. If the TSB termination was successful, the routine executes the instruction 110 to obtain menu manager storage space.

The routine next advances to inquiry 112 to determine if the operator has depressed the INSTR key or the VAR key. If the Instruction key was depressed, the routine enters the display instruction menu 114 to put up the instruction menu. If the Variable key is depressed, the routine advances to the set up for variable instruction 116.

Upon completion of the execution of the instructions 114 or 116, the routine advances to inquiry 118 to determine if the "cancel" flag was set. If the cancel flag was set, the routine branches to the menu entered or cancelled inquiry 120. If the menu has not been entered or cancelled, the routine branches back to inquiry 112. If it has been entered or cancelled, it advances to the release manager storage space instruction 122, advances to redisplay text viewport instruction 124, and then the set return code 104 returns control to the operator. If the cancel flag is not set, the routine advances from the inquiry 118 to instruction 126 to obtain storage for and initialize the control block (TICB). Following initialization of the text instruction control block, the routine advances to invoke the specific instruction handler (RFILINST) 64 with instruction 128. If the routine inquiry 130 determines that an instruction was created, a instruction 132 inserts the instruction(s) into text. If an instruction was not created, the routine branches to instruction 134 to free storage and the control block.

Figure 4:
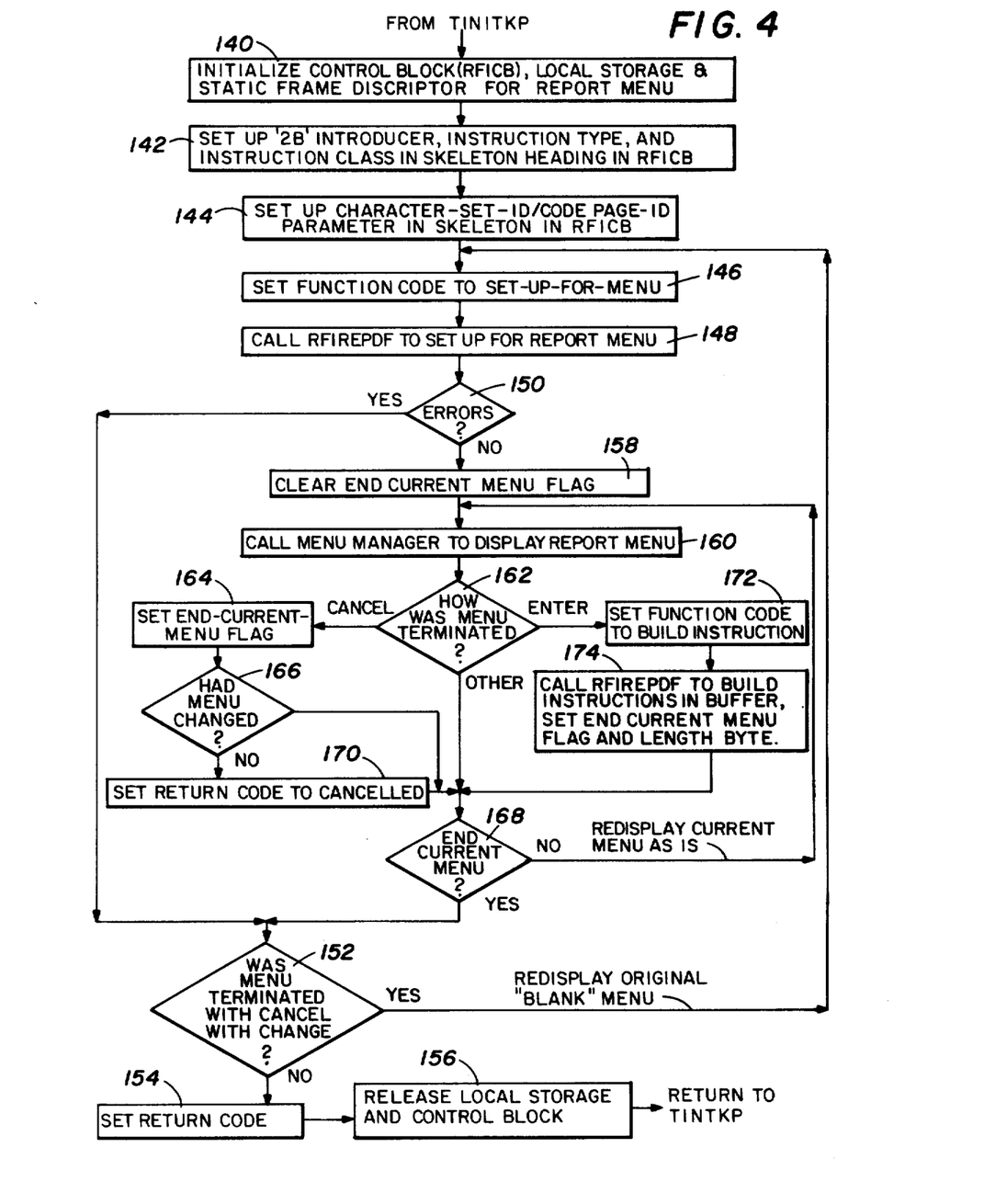
FIG. 4 is a flow chart diagram of the RFILINST program routine.

Referring to FIG. 4, the RFILINST routine 64 is set forth in a flow chart arrangement. The purpose of the RFILINST routine is to create records instructions.

The RFILINST routine 64 receives control from the TINITKP routine 74 when the operator chooses a records instruction, in this case the report definition menu instructions. The initial instruction 140 initializes the record control block (RFICB) and allocates local storage and static frame description for the report menu. The routine advances to instruction 142 to set up the "2B" introducer, instruction type, and instruction class and skeleton heading in the control block (RFICB). The initialization of the control block is completed by instruction 144, setting up character-set-ID (CSID)/code page-ID (CPID) parameter in skeleton in the control block. (See FIG. 9).

The RFILINST routine 64 advances to instruction 146 to set a function code to set up for menu. The routine next calls the instruction handler (RFIREPDF) 56 report definition handler to set up for the report definition instructions menu.

The routine advances to inquiry 150 to determine if there are any errors. If there are any errors, the routine branches to inquiry 152 to determine if the menu terminated with cancel with change to the menu. If it did, the routine branches to instruction 146 to redisplay the original report menu displayed. If the menu terminated with cancel with no change to the menu, the control returns to the TINITKP routine 74 through the set return code instruction 154 and instruction 156 releases the local storage and control block.

If the inquiry block 150 determined that there were no errors, the routine advances to instruction 158 to clear a current menu flag to call the menu manager 62 to display the report menu instructions 160. The menu manager verifies the input into the "yes/no options" and verifies the syntax of the variable name (either field name or relative field number) in the Group Headings and Summaries. The routine advances to the inquiry 162 to determine how the menu was terminated. If the menu terminated with cancel, it executes the set end-current-menu flag 164 and determines through inquiry 166 if the menu changed. If the menu has changed, the program branches to inquiry 168 to determine if that is the end of the current menu. If it has not, the end program branches back to the instruction 160 to redisplay the current menu as it is. If that is the end of the current menu, it returns to the TINITKP routine 74. If the inquiry 166 indicates the menu has not changed, the instruction 170 to set return code to cancelled is executed prior to entering the end to current menu inquiry 168.

If the inquiry 162 determines that the menu terminated with ENTER, a set function code to build an instruction 172 is executed to cause the routine to execute instruction handler (RFIREPDF) again to build the instruction in the buffer provided by TINITKP and to set the length of the data in the control block (TICB). If the instruction handler cannot build the instruction because of unspecified required parameters, the menu manager displays a message and redisplays the menu.

Figure 5:
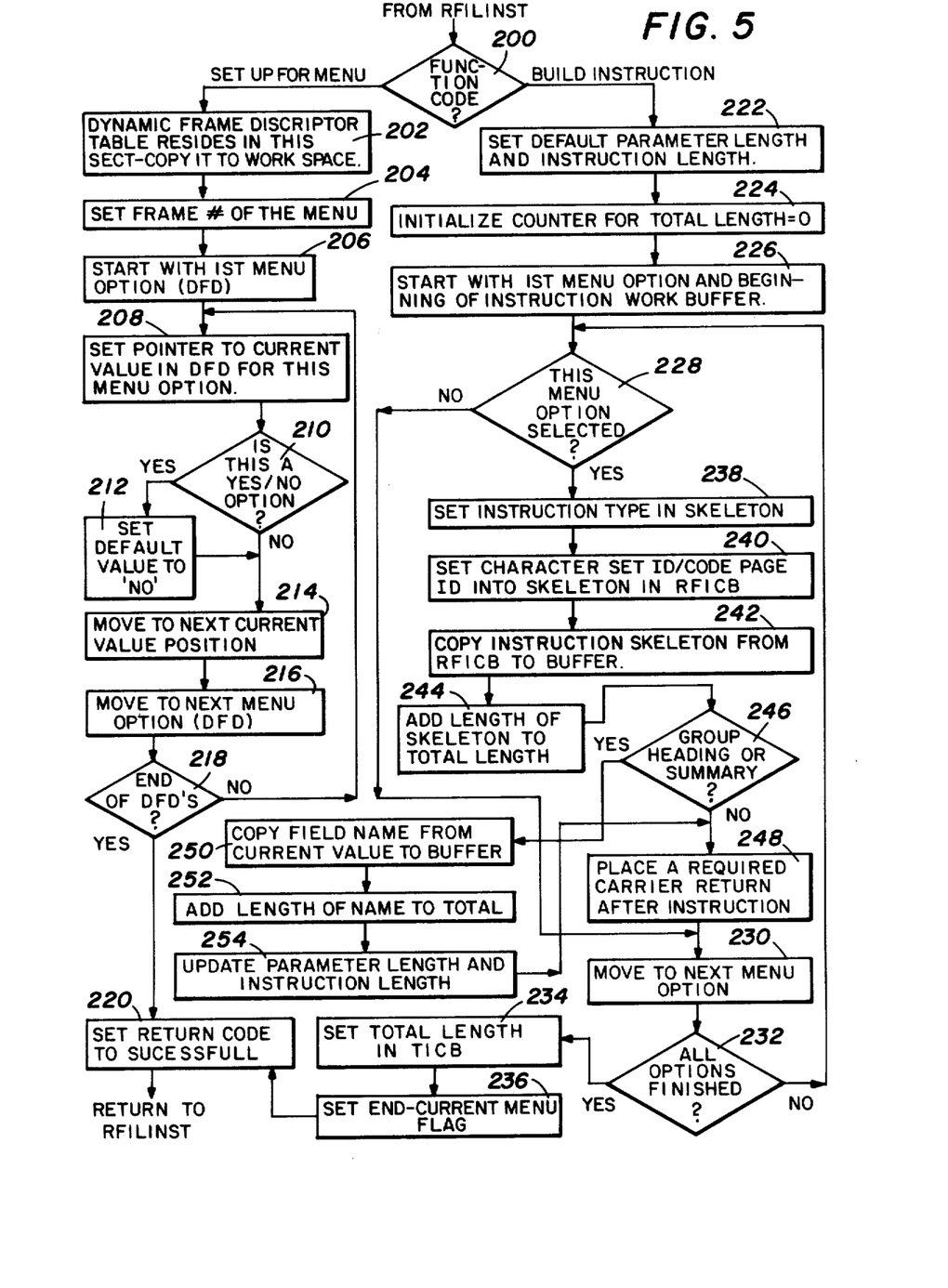
FIG. 5 is a flow chart diagram of the RFIREPDF program routine.

Referring to FIG. 5, the RFIREPDF report definition handler routine 56 is set forth in a flow chart arrangement. The purpose of the report definition handler routine 56 is to process one or more report instructions. A function code inquiry 200 is initially made to determine which of two modes are to be utilized. One mode sets up for the menu manager to display the menu, and the other mode sets up to process the input to the menu and build the instruction.

If the function code is set up for menu, a dynamic frame descriptor (DFD) instruction 202 sets up for changing data in the menu, and an instruction 204 sets the frame number of the menu. The routine then starts with the first menu option (DFD) 206 and executes instruction 208 to set the pointer to the current value in the dynamic frame descriptor (DFD) for this menu option. An inquiry 210 determines if this is a "yes/no" option. If it is a "yes/no" option, the program branches to instruction 212 to set the default value to "no." If the inquiry 210 determines that it is not a "yes/no" option, the routine moves to an instruction 214 to move to the next current value position. The routine then advances to instruction 216 to move to the next menu option (DFD). An inquiry 218 is made to determine if that is the end of the DFD's, and if it is not the program branches back to instruction 208 to set the pointer to the current value in DFD. However, if the inquiry determines if that is the end of the DFD's, a successul return code 220 is set and the routine returns control to the RFILINST routine 64.

If the inquiry to determine the function code determines it is to process the input to the menu and build the instruction, the routine branches to instruction 222 to set the default parameter length and instruction length. The routine executes instruction 224 to initialize the counter for a total length equals "0", and it then executes instruction 226 to start with the first menu option and beginning of instruction work buffer. The routine enters inquiry 228 to determine if the menu option is selected, and if it is not the routine branches to an instruction 230 to move to the next menu option to inquiry 232 to determine if all options are finished. If the options are finished, the routine executes instruction 234 to set the total length and the text instruction control block, sets the end-current menu flag 236, sets return code to successful instruction 220 and returns control to the RFILNIST routine 64. If inquiry 232 determines that all options are not finished, the program branches back to the inquiry 228. If the menu option is selected, as determined by inquiry 228, it sets the instruction type in skeleton 238 and sets the character set ID (CSID)-/code page-ID (CPID) into skeleton in the RFICB 240. The routine next executes instruction 242 to cause the instruction skeleton to be copied from the control block to buffers, and instruction 244 adds the length of the skeleton to the total length.

The routine advances to inquiry 246 to determine if it is a Group Heading or Summary. If it is not the routine proceeds to instruction 248 to place a required carrier return after the instruction and moves to the next menu option instruction 230. However, if inquiry 246 determines if it is a Group Heading or Summary, it executes instruction 250 to copy the field name for the current value to the buffer, add the length of the name to the total 252, and execute instruction 254 to update the parameter length and instruction length.

Figure 6:
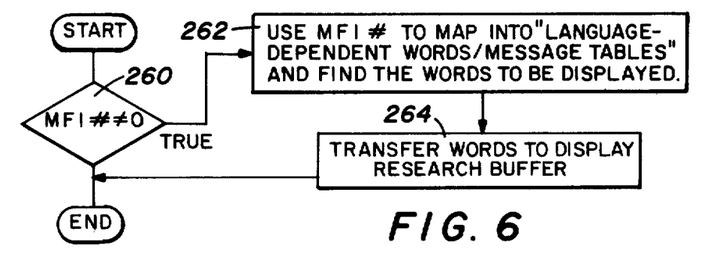
FIG. 6 is a flow chart diagram of the MSGMOVE program routine.

Referring to FIG. 6, the MSGMOVE routine 86 is set forth in a flow chart arrangement. The routine first enters inquiry 260 to determine if the MFI number does not equal "0". If the MFI number does equal "0", the MSGMOVE routine 86 is terminated. However, if the MFI number does not equal "0," the program executes instruction 262 to use the MFI number to map into the language-dependent words/message tables 80 and find the words to be displayed. The following instruction 264 causes the routine to transfer words to the display refresh buffer 68 and then to terminate the MSGMOVE routine 86.

Figure 7:
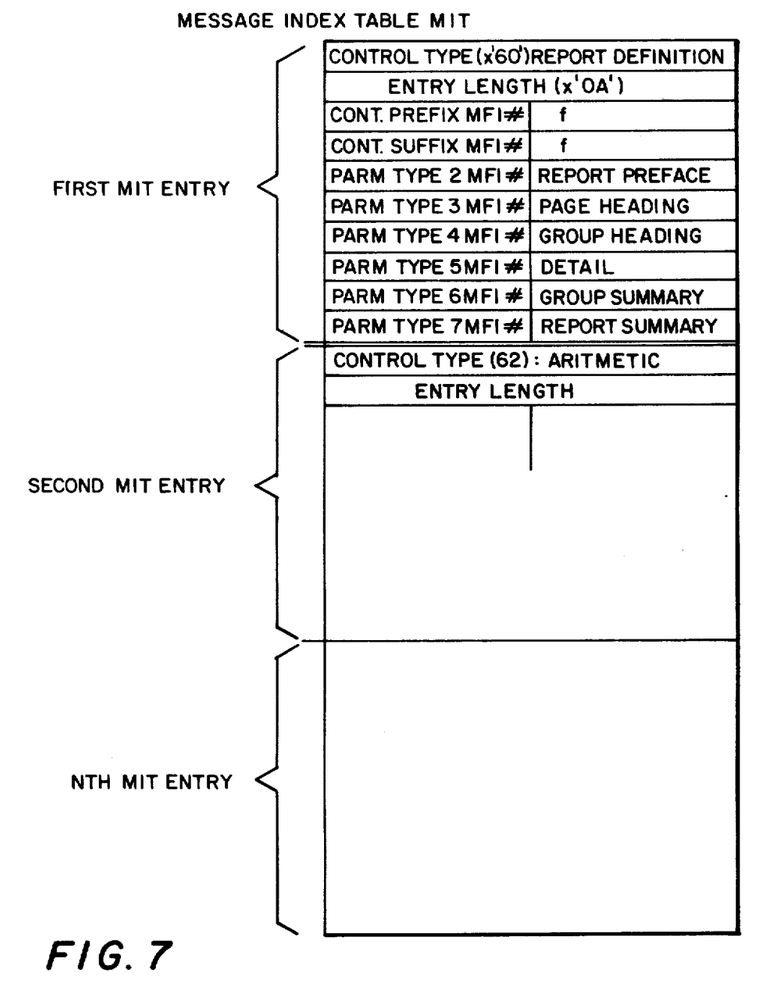
FIG. 7 is the Message Index Table.

Referring to FIG. 7, the message index table 84 is set forth. The message index table 84 is searched by the report instruction translation utility program 82. The first message index table entry is for the control type for the report definition instruction. The left column represents the index code, and the right column represents the words and graphics that will be fetched from the English version of the words/message tables 84 for the corresponding MFI number in the left column. Additional control types may be entered in the message index table 84, such as the arithmetic control type shown on the second MIT entry. The number of MIT entries is repeated for as many different instruction types as are to be supported with language-dependent display in text.

Figure 8:
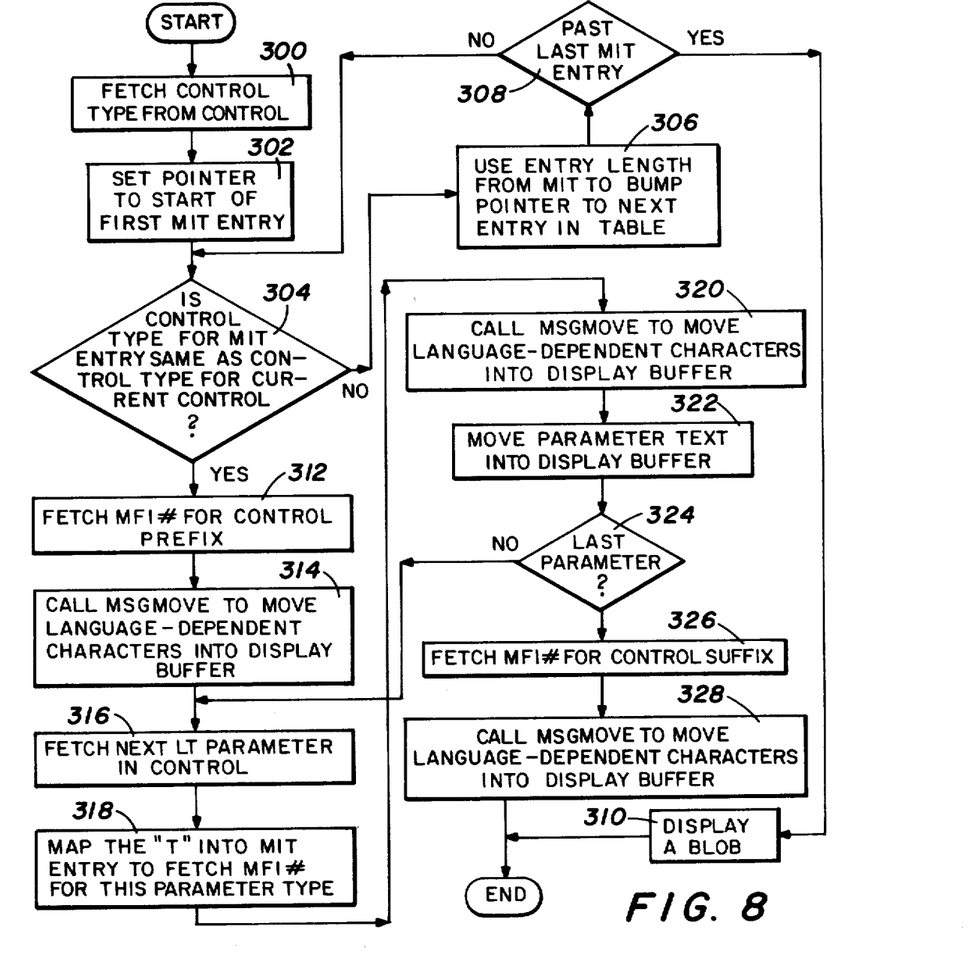
FIG. 8 is a flow chart diagram of the Report Instruction Translation Utility routine.

Referring to FIG. 8, the report instruction translation utility routine 82 is set forth in a flow chart arrangement. Upon entry into the routine, an instruction 300 is executed to fetch the control type from control, and instruction 302 causes the pointer to be set to the start of the first message index table entry. An inquiry 304 is made to determine if the control type for the MIT entries is the same as the control type for the current control, e.g., report definition control type or arithmetic control type, etc. If the control types are different, the routine branches to an instruction 306 to use the entry length from the MIT to bump the pointer to the next entry in the table. The routine next advances to inquiry 308 to determine if this places the pointer past the last MIT entry, and if it does the program branches to display a blob instruction 310 and end the routine. If the inquiry 308 determines that the pointer is not past the last MIT entry it returns to inquiry 304. If the control type for the MIT is the same as the current control, an instruction 312 causes the routine to fetch the MFI number for the control prefix. The routine next executes instruction 314 to call the MSGMOVE routine 86 to move language-dependent characters into the display buffer. The routine next executes instruction 316 to fetch the next LT parameter in control. Instruction 318 maps the "T" into MIT entry to fetch an MFI number for this parameter type. The routine next executes instruction 320 to call MSGMOVE to move language-dependent characters into display buffer. The routine next advances to instruction 322 to move parameter text into display buffer. An inquiry 324 determines if this is the last parameter. If it is not the last parameter, the program branches back to instruction 319. If it is the last parameter, it fetches the MFI number for the control suffix 326, and executes instruction 328 to call MSGMOVE to move language-dependent characters into display buffer and terminates the program.

Figure 9:
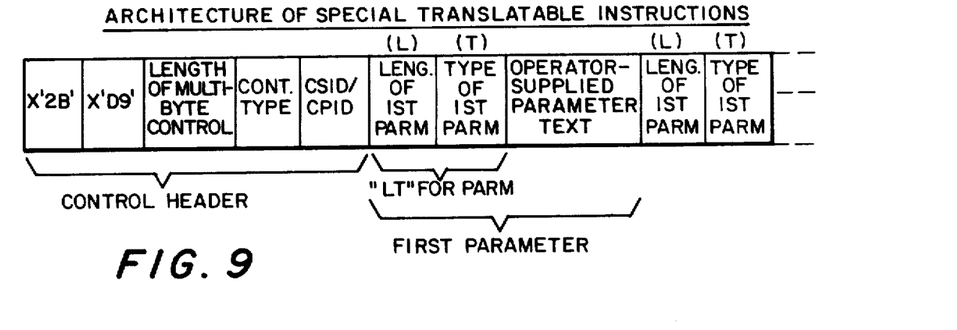
FIG. 9 is a block diagram of the architecture of the special translatable instructions.

Referring to FIG. 9, the architecture for the special translatable instructions is set forth. The "2B" identifies this as a multibyte control block, and "D9" indicates this is a special class assigned to this group of controls, requiring the special formatting and interpretation rules to apply. The next block of the formatted block identifies the length of the remainder of the control, including all parameters. The final control header block is the CONTROL-TYPE byte, which identifies the specific report or merge function to be performed.

The CSID/CPID block identifies the character set ID and code page ID of every character-string parameter of this control. The format of the information in this block is length, parameter-type byte, a two byte binary value specifying a character set ID, and a two byte binary value specifying a code page ID.

The control may have one or more character-stream parameters. Each of these parameters must have the following format: a length, type and value. The length is the length of the entire parameter, including the length and type bytes. The "type" is the parameter-type byte, which specifically identifies the purpose of this parameter. The "value" is the operator-supplied parameter text.

For report instructions, the control type identified as X "60" has a control prefix "+" and a control suffix "+". The report instruction always contains one parameter (i.e., one L, T, Parameter). One of six different "type" values is allowed:

| PARAM TYPE | ENGLISH PARAM PREFIX (reference by MITMFI #) |
|---|---|
| X'02' | Report Preface |
| X'03' | Page Heading |
| X'04' | Group Heading, |
| X'05' | Detail |
| X'06' | Group Summary, |
| X'07' | Report Summary |

All parameter types except X'04' and X'06' always have empty operator-applied parameter text sections. Parameter types X'04' and X'06' require parameter-text sections containing a field name of a field to be grouped by.

In general, supported controls are always displayed as follows: 'control prefix', 'parm 1 prefix', 'parm 1 text', 'parm 2 prefix', . . . 'parm N text', 'control suffix'.

Therefore, the six different report instructions noted in the table above are displayed (in English):
+Report Preface+
+Page Heading+
+Group Heading, Field Name+
+Detail+
+Group Summary, Field Name+
+Report Summary+

The field "field name" portion of the examples is an operator-keyed name of a field to be grouped by. All other displayed characters are system-generated, depending on the currently loaded menu language.

Figures 10, 11:
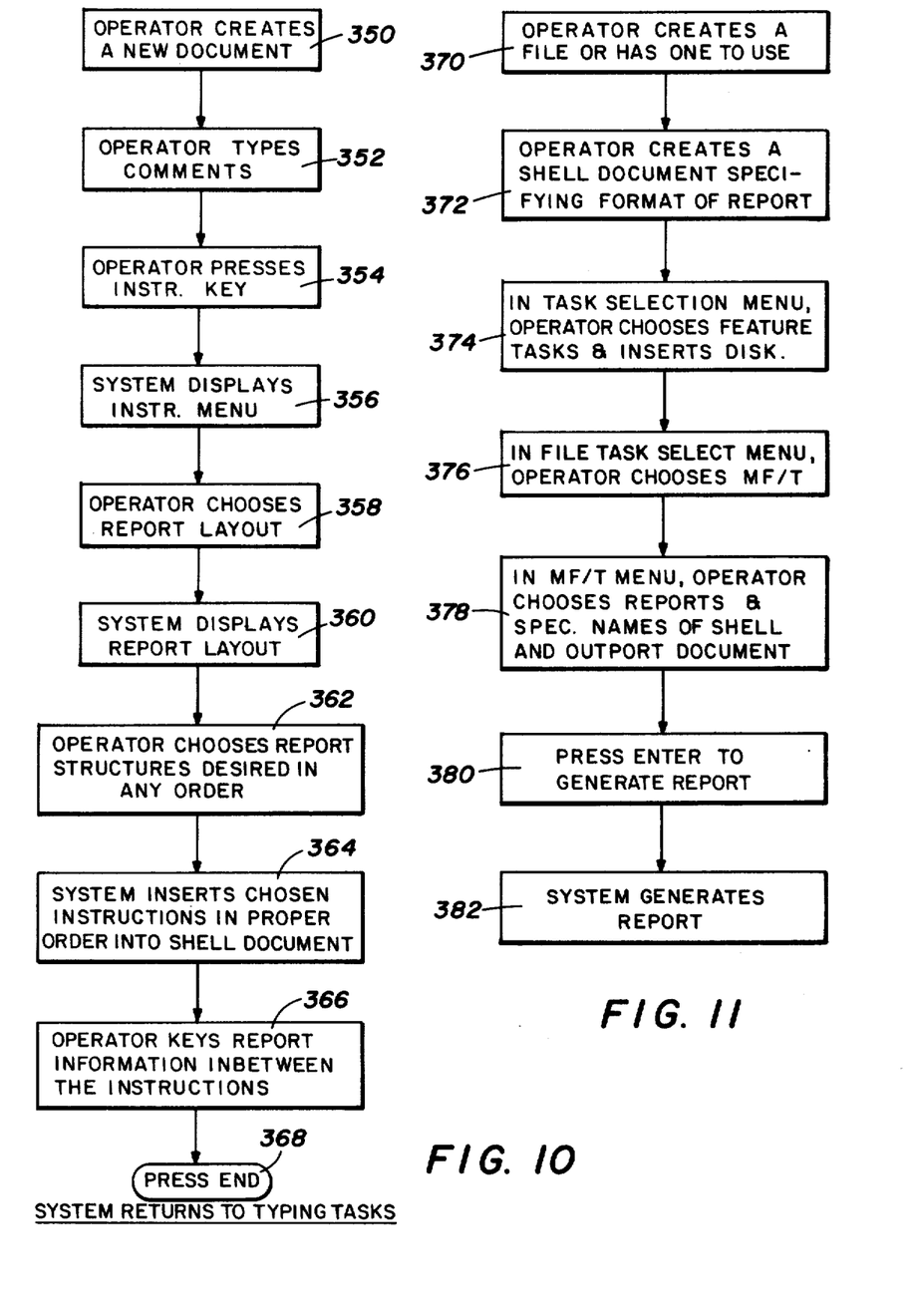
FIG. 10 is a flow chart diagram of the operator's shell creation routine.
FIG. 11 is a flow chart diagram of the operator's report generation routine.

Referring to FIG. 10, the operator's shell creation routine is set forth in a flow chart arrangement. The operator's first step is to create a new document 350 and type comments 352. The operator presses the INSTR key 354, and the system displays the instruction menu 356. The operator then chooses the report layout 358, and the system displays the report menu 360 (See FIG. 12). The operator then chooses the reporting instructions desired in any order 362. The system automatically inserts chosen instructions in the proper order into the shell document 364, and the operator keys the report information in between the instructions 366. The operator then presses key "end" 368 to cause the system to return to other typing tasks.

Referring to FIG. 11, the operator's report generation routine is set forth in a flow chart arrangement. The operator begins at step 370 to create a file or he has one to use. The operator next creates a shell document specifying the format of the report 372. In task selection the operator chooses feature tasks and insert disks 374. In the file tasks select menu, an operator chooses a merge file/text task 376. In the merge file/text menu, the operator chooses reports and specific names of shell and output document 378. The operator then presses the "ENTER" key to generate the report 380, and the system generates the report 382.

Figure 12:
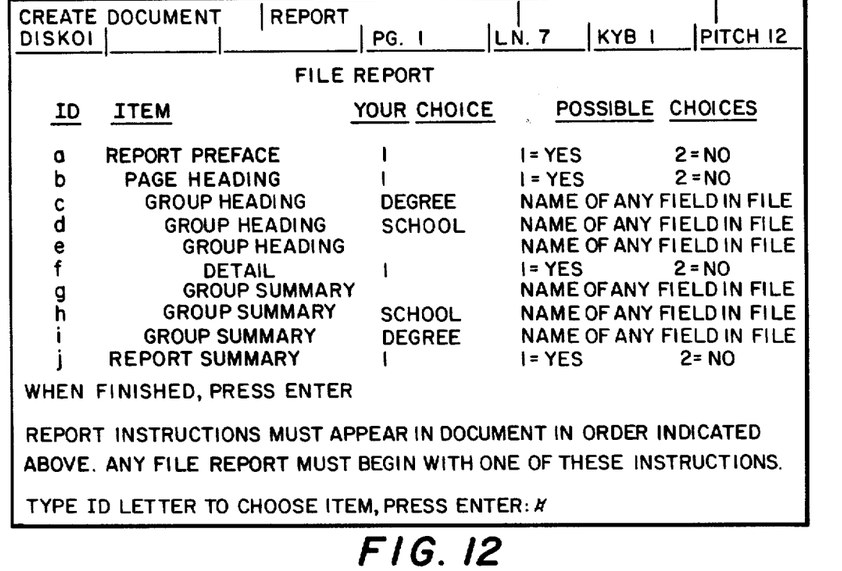
FIG. 12 illustrates a filled-in Report Definition Instruction Menu.

FIG. 12 illustrates a filled-in report definition instructions menu. The report definition menu supports the entry into a shell document of several instructions that control logical separation on output. The operator selects the "create document" item from a typing task selection menu which calls up the typing frame for creating a document. In response to the operator's pressing the instruction key, the instruction menu is then presented to select the file-report definition menu illustrated in FIG. 12.

The first column of the file report identifies each of the ten instructions listed under the item column. The report definition instructions are visually displayed to reinforce the concept of a nested hierarchy groups of record. As noted from the visual display under the item column, Report Preface is aligned over Report Summary, Page Heading is aligned separately, and each of the Group Headings is aligned over the Group Summary instruction. The Detail instruction is grouped in the center of the operator to enter detail report text. The third column "Your Choice" has been completed in FIG. 12 to show typical selections that might be made by an operator. The variable items shown under the fourth column "Possible Choices" have been selected for two of the group headings, one corresponding to the group summaries.

Figure 13:
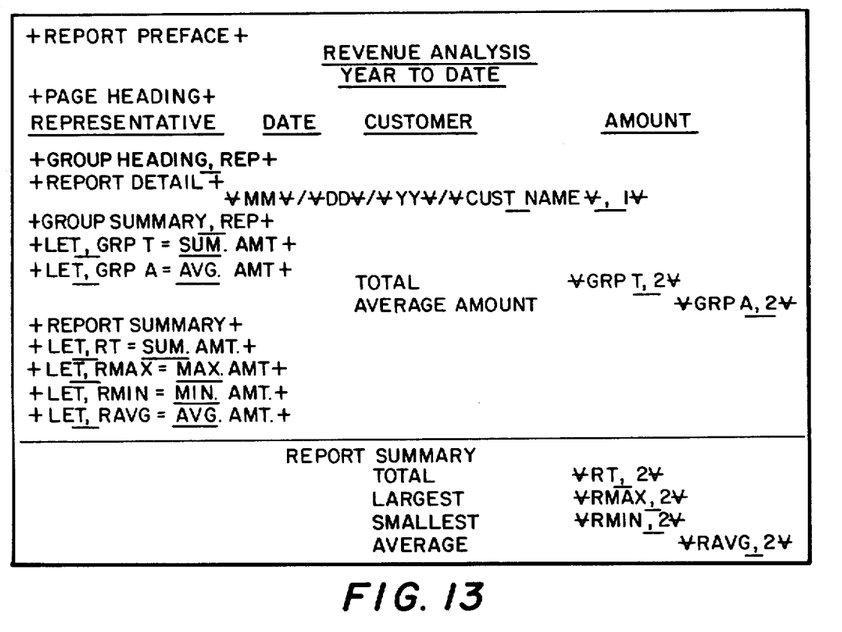
FIG. 13 illustrates a printed shell document.

FIG. 13 illustrates a printed shell document including the report definition instructions and report text entered by the operator. The report definitions instruction include a prefix and suffix "+" to set the instruction apart from the text entries.

In operation, the report preparation system of the present invention is utilized in word and data processing units to generate several types of merged output.

The merge file/text task supports the insertion of data from file records into a document containing embedded instructions, including possible variable instructions, arithmetic instruction, report definition instructions, and/or record group combination instructions. A multicolumn heading instruction can be inserted, if no report definitions instructions are embedded. A document containing the embedded instructions is called a shell document. The several types of merged output which may be generated by the shell document include as an example repetitive letters and file listings such as reports and a multi-column listings.

In repetitive letters, a single record is merged with a copy of the shell document to form the output document. This process is repeated for each qualified record. After each record is merged with the shell document, it is appended to the output document and established primary master format control is inserted into the data streams for the next letter formed will start at the top of the next page. However, in file listing a single document is produced, with no Document Restarts inserted automatically by the system. All the qualified records are used to make up this one report or listing. Report definition instructions provide for logical separation, i.e., header and summary text before and after groups of records having identical values for a particular field. The report definition instructions must be entered into the shell document in the sequence indicated in the menu. Any of the instructions may be omitted and certain instructions may be repeated, but the order permitted among the ones selected is automatically fixed to be redisplayed in the order displayed from top to bottom in the report definition menu. Each report definition instruction is a line-ending code, meaning a carrier return is automatically performed before and after the instruction.

The report definition instruction menu may be visually displayed to an operator for creation of the shell document on a display such as display 24 of FIG. 1. The types of report instructions listed under the item column include a Report Preface, Page Heading, Group Heading, Detail, Group Summary and Report Summary. The operator may select the instructions in any order of typing the appropriate ID letter to choose that instruction item. There are three group headings to indicate there are three possible levels of sorting, including an instruction to perform a summary for each of the groups. The instructions are visually displayed in a manner to reinforce for the operator the concept of a nested hierarchy of groups of records.

If the operator desires to have the Report Preface, the ID code letter "a" proper code "1" is entered and an automatic carrier return is executed. The operator can now enter the desired report text between report instructions. The operator may select for a report preface text "Revenue Analysis, Year-To-Date" as shown in FIG. 13. If page heading is desired, the operator selects the ID letter "b" and inserts the proper code "1". The system automatically inserts a carrier return and the operator can subsequently enter the desired report text for the page heading.

If there is to be a first group heading, the operator selects the ID letter "c". The operator then may insert the variable name of any field in the file, such as "degree". A next group heading within the first heading may be selected by typing the ID letter "d". An operator may then insert the name of any field in the file, such as "school." The operator may also insert a field number in the file when the operator is preparing the file report in a language different from that used to assemble the Shell document. As illustrated in FIG. 12, the operator may elect not to use an instruction, such as the third group heading associated with ID letter "e". Record detail may be provided if the operator selects the ID letter "f", and makes the proper code selection. The system then executes an automatic carrier return and the operator may insert the desired record detail, such as "customer, name, amount" as shown in FIG. 13.

The operator continues filling in the report definition instruction menu by selecting the desired report definition instructions. The report document created by the operator selection and report definition instructions will then be entered into storage for use in the merge file/test task. Regardless of the order of selection of report difinition instructions, the report shell document will display the instructions in the proper fixed order. The words displayed in a shell document, such as FIG. 13, will appear in the language of the current program loaded in the word/data processor, regardless of the language used when the shell document was created. FIG. 13 illustrates how a shell document would print on a machine that contained an English program load.

Although the preferred embodiments of the invention have been illustrated in the accompanying Drawings and described in the foregoing Detailed Description, it will be understood that the invention is not limited to the preferred embodiments disclosed, but are capable of numerous rearrangements, modifications, and substitution of parts and elements without departing from the spirit of the invention.

We claim:

1. A system for preparing multiple report definition instructions for a shell document to control logical separation on output of a file report generated by an electronic digital signal processor, comprising:
   a menu listing of report definition instructions stored in a memory associated with the signal processor:
   means for accessing and displaying said menu of report definition instructions;
   means for an operator to select any of said report definition instructions from said displayed menu;
   means for operator entry of report text between said selected report definition instructions;
   means for loading a system program in said signal processor, said system program written to support operators who read a particular language;
   means for transferring said operator-selected report definition instructions and operator-entered report text to said memory for storage in the language supported by the system program loaded in said signal processor, said operator-selected report definition instructions and operator-entered report text forming said shell document;
   means for selectively translating said shell document to the language supported by a current system program loaded in said signal processor when said current system program supports a language different from the language supported by the system program loaded when said shell document was formed; and
   means for displaying said shell document for generating a file report, said shell document being displayed in the language of said current program loaded in the processor, wherein the display of multiple report definition instructions may be presented in a meaningful way for operators that read different languages.

2. The system for preparing multiple report definition instructions of claim 1, wherein said means for displaying said report definition instruction menu includes means for visually presenting the report definition instructions in a layout to provide a visual representation to an operator that said report definition instructions form a hierarchy.

3. The system for preparing multiple report definition instructions of claim 1 and further comprising means associated with the display of an operator-selected report definition instruction to identify said instruction as a report definition instruction.

4. The system for preparing multiple report definition instructions of claim 1, wherein said report definition instruction is a multibyte control sequence internally formated to provide a direct means of identifying a control within a data stream via words in the language of the current program loaded in said signal processor.

5. The system for preparing multiple report definition instructions of claim 4, wherein said formated multibyte control sequence comprises:
- means for identifying the instruction as a multibyte control;
- means for typing the control to identify it as a report definition instruction;
- means for identifying the length of the remainder of the control;
- means for identifying the character set ID and code page ID of every character-string parameter of the control; and
- one or more character-string parameters, including means for identifying the length, type and value of the parameter.

6. The system for preparing multiple report definition instructions of claim 1, wherein said means for selectively translating the shell document comprises a language-dependent words/message table including a graphic symbol or word associated with the control block for the report definition instruction.

7. The system for preparing multiple report definition instructions of claim 1 and further comprising:
- means for automatically executing a carrier return following the operator selection of a report definition instruction to facilitate the entry of report text.

8. The system for preparing multiple report definition instructions of claim 1 and further comprising:
- means for displaying the selected report definition instructions in the order fixed by the original display of the report definition menu, regardless of the order in which the instructions were selected by the operator.

9. The system for preparing multiple report definition instruction of claim 1, wherein said menu listing of report definition instructions comprises:
- a report preface instruction;
- a page heading instruction;
- group heading instructions;
- a record detail instruction;
- group summary instructions; and
- a report summary instruction.

10. The system for preparing multiple report definition instructions of claim 9, wherein said group heading instructions includes means for operator entry of a variable field name from the file to control the selection of the group.

11. The system for preparing multiple report definition instructions of claim 9, wherein said group heading instructions includes means for operator entry of a variable field number from the file to control the selection of the group.

* * * * *